UNITED STATES PATENT OFFICE.

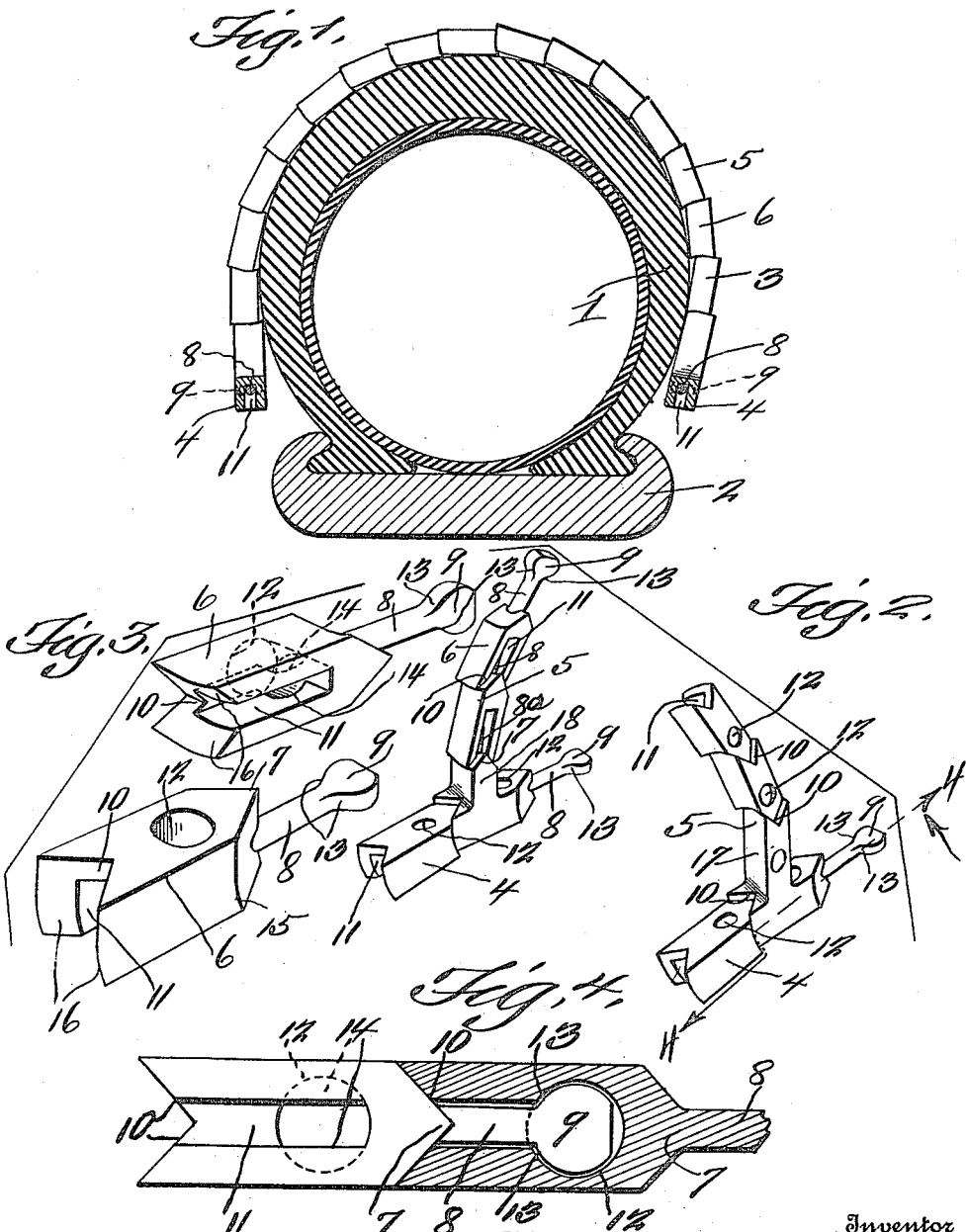

JAMES R. STACK, OF DULUTH, MINNESOTA.

EMERGENCY REPAIR-LINK FOR ANTISKID-CHAINS.

1,265,543.

Specification of Letters Patent.

Patented May 7, 1918.

Application filed April 30, 1917, Serial No. 165,521. Renewed April 4, 1918. Serial No. 226,778.

*To all whom it may concern:*

Be it known that I, JAMES R. STACK, a citizen of the United States, residing at Duluth, in the county of St. Louis, State of Minnesota, have invented a new and useful Emergency Repair-Link for Antiskid-Chains; and I do hereby declare the following to be a full, clear, and exact description of the invention, such as will enable others skilled in the art to which it appertains to make and use the same.

This invention relates to anti-skid chains for tires, and particularly to an improved emergency repair link, whereby any section of the anti-skid device may be easily and quickly repaired.

A further object of the invention is the provision of an improved emergency link, so that should anyone of the links of any section of the anti-skid device become broken, or otherwise useless, a new link may be easily and quickly inserted, thereby practically renewing the anti-skid device.

A further object of the invention is the provision of a link consisting of a body having a slot on one face and a cylindrical opening on the other face, the two being in communication, said slot at one end being open, whereby a restricted shank of an adjacent link may be received, so that the head of the shank may engage and coöperate in said cylindrical opening. When one link is connected to another link, the two links have V-shaped connections, thereby preventing the links from twisting relative to each other. However, when connecting one link to another link, it is disposed at right angles to the other link, so that the flat head of the shank may enter the slot, after which a twist is imparted to the link that is connected, and then it is moved pivotally, whereby the V-shaped connections between the two links may coöperate.

In practical fields the details of construction may necessitate alterations falling within the scope of what is claimed.

The invention comprises further features and combination of parts as hereinafter set forth, shown in the drawings and claimed.

Figure 1 is a sectional view through a tire, showing an anti-skid device applied thereto said device being constructed of the improved emergency links.

Fig. 2 shows views of portions of the side chains of the anti-skid device, and parts of the cross chains.

Fig. 3 discloses views of two links in position ready to be united.

Fig. 4 is a sectional view on line 4—4 of Fig. 2.

Referring more especially to the drawings 1 designates a conventional form of automobile tire, and 2 the rim, and 3 the antiskid device, which comprises the side chains 4, and the cross chains 5. The several chains of the anti-skid device are constructed of similar links, and each in itself constitutes an emergency link, whereby the several chains may be easily and quickly repaired. Each link comprises a body 6, which in cross section is rectangular. One end of the body has a V-shaped portion 7, and from the apex of this portion a shank 8 extends. The shank terminates in a flat head 9, which is in a plane at right angles to the V portion. The other end of the body is provided with a V-shaped recess 10, to receive the V-shaped portions of an additional link. One face of the body of each link is provided with an elongated slot 11, which extends from the crotch of the recess 10 almost to the V-shaped portion 7. Constructed through the body at right angles to the slot and from the face opposite the face having the slot is a cylindrical opening 12. This opening adjoins and communicates with the slot. In connecting two links, one link is disposed at right angles to the other link, then the flat head is inserted through the closed end of the slot 11, until the head enters the opening 12, after which a twist is imparted to the link (which is at right angles to the other link), thereby preventing removal of the head, by reason of the fact that portions 13 engage the shoulders 14, located where the openings 12 adjoins the slot 11. After having imparted a twist to said link at right angles to the other link, it is moved pivotally, the head fulcruming in the opening 12, until the V-shaped portion 7 enters the V-shaped recess 10 of the adjacent link. It is to be observed that the portions 15 and 16 of the V-shaped portions 7 and the recess 10 respectively are curved on the arc of a circle, whose center is the pivotal engagement of the head 9 in the opening 12, so that when the link (which is at right angles to the other link) is moved pivotally, its V-shaped portion 7 will enter the V-shaped recess 10 of the adjoining link, thereby insuring a secure locking union of the parts. In practice the side chains of the anti-skid device at intervals have links provided with right angled extending parts 17 and 18. The part 17 is designed to be constructed similar to the body of either one of the links shown in Fig. 3, while the part 18 is in the form of a lug provided with a V-shaped portion similar to the V-shaped portion of each link, therefore it is designated by the reference character 7. Extending from this V-shaped portion of the lug 18 is a shank 8ª, similar to the shank 8, and which is provided with a head (not shown) similar to the head 9. The part 17 which is similar to the body of either link in Fig. 3 receives the shank of an adjacent link of a cross chain, while the shank 8ª of the lug 18 enters the slot of a link at the other end of the cross chain. By the provision of the parts 17 and 18, the cross chains of the anti-skid device may be easily and quickly connected, and since each link constitutes an emergency link, any link may be easily and quickly removed and a new one substituted, whereby the anti-skid device may be renewed or repaired. However, the cross chains which are designed to be constructed of emergency links may be connected in any suitable manner to the side chains made up of any other form of link; other than shown in the drawing.

The invention having been set forth what is claimed as new and useful is:—

1. An emergency link comprising a body substantially rectangular in cross section provided with a slot open on one face of the body and at one end, one end of said body being V-shaped, its apex having a cylindrical shank terminating in a flat head to enter one end of said slot of an adjacent link, said body adjacent its V-shaped portion on its face opposite the face having the slot provided with a cylindrical opening to receive the head of the shank of an adjacent link, the other end of the body having a V-shaped recess, to receive the V-shaped end of an adjacent link, when said adjacent link is moved pivotally, using the head as a fulcrum.

2. An emergency link comprising an elongated body provided with a cylindrical opening near one end and having an elongated slot open on the face of the body opposite said opening, said slot adjoining and communicating with the opening, said body where the opening and slot adjoin having shoulders, one end of said body having a shank terminating in a flat head to pass through the closed end of the slot and adapted to enter said opening, whereby said head may fulcrum on said shoulders when two links are connected, said body at its end opposite the shank having male and female connections with an adjacent link, whereby two links may be united.

In testimony whereof I have signed my name to this specification in the presence of two subscribing witnesses.

JAMES R. STACK.

Witnesses:
LEON LOHN,
E. D. CRAWFORD.